US005549352A

United States Patent [19]

Janotik et al.

[11] Patent Number: 5,549,352
[45] Date of Patent: *Aug. 27, 1996

[54] SPLIT JOINT CONSTRUCTION FOR A SPACE FRAME

[75] Inventors: Adam M. Janotik, Grosse Ile; Lawrence P. Kazyak, Novi, both of Mich.

[73] Assignee: Ford Motor Company, Dearborn, Mich.

[*] Notice: The term of this patent shall not extend beyond the expiration date of Pat. No. 5,332,281.

[21] Appl. No.: 409,619

[22] Filed: Mar. 23, 1995

Related U.S. Application Data

[63] Continuation of Ser. No. 207,983, Mar. 8, 1994, abandoned, which is a continuation of Ser. No. 876,156, Apr. 30, 1992, Pat. No. 5,332,281.

[51] Int. Cl.⁶ ........................................ B62D 25/20
[52] U.S. Cl. .................... 296/209; 296/29; 296/203; 296/205; 52/653.2
[58] Field of Search ........................ 296/29, 203, 204, 296/205, 209; 52/653.1, 653.2, 656.1, 731.6; 280/781, 785; 403/208, 241, 270, 271

[56] References Cited

U.S. PATENT DOCUMENTS

| 1,823,028 | 9/1931 | Caldwell | 285/189 |
|---|---|---|---|
| 1,972,309 | 9/1934 | McMurchy | 403/335 |
| 1,988,389 | 1/1935 | Mioton | 403/237 |
| 2,016,702 | 10/1935 | Bauer | 403/237 |
| 2,640,443 | 6/1953 | Schieler et al. | 105/404 |
| 2,711,340 | 6/1955 | Lindsay | 296/204 |
| 3,132,891 | 5/1964 | Pyuro et al. | 296/204 |
| 3,528,699 | 9/1970 | Wessells III | 296/209 |
| 3,851,981 | 12/1974 | Corsi et al. | 403/237 |
| 4,163,572 | 8/1979 | Benscoter | 285/121 |
| 4,552,400 | 11/1985 | Harasaki et al. | 296/185 |
| 4,618,163 | 10/1986 | Hasler et al. | 280/785 |
| 4,726,166 | 2/1988 | DeRees | 52/694 |
| 4,759,489 | 7/1988 | Pigott | 228/102 |
| 4,807,925 | 2/1989 | Sakamoto et al. | 296/194 |
| 4,826,238 | 5/1989 | Misono et al. | 296/205 |
| 4,836,600 | 6/1989 | Miyazaki et al. | 296/197 |
| 4,887,862 | 12/1989 | Bassi | 296/204 |
| 4,900,083 | 2/1990 | Kumasaka et al. | 296/197 |
| 4,912,826 | 4/1990 | Dixon et al. | 296/187 |
| 4,958,844 | 9/1990 | Hancock | 296/204 X |
| 4,968,087 | 11/1990 | Goria | 296/197 |
| 4,976,490 | 12/1990 | Gentle | 296/183 |
| 5,062,369 | 11/1991 | Cobden et al. | 296/204 X |
| 5,271,687 | 12/1993 | Holka et al. | 296/205 X |
| 5,322,281 | 7/1994 | Janotik et al. | 496/209 |

FOREIGN PATENT DOCUMENTS

| 683437 | 3/1964 | Canada . | |
| 866607 | 8/1941 | France . | |
| 1584186 | 12/1969 | France . | |
| 2333691 | 7/1977 | France . | |
| 2591681 | 6/1987 | France . | |
| 3119666 | 1/1982 | Germany | 296/203 |
| 57-87769 | 6/1982 | Japan . | |
| 61-1582 | 1/1986 | Japan | 296/209 |
| 62-258868 | 11/1987 | Japan | 296/209 |
| 674175 | 6/1952 | United Kingdom . | |
| WO8704679 | 8/1987 | WIPO . | |

*Primary Examiner*—Andrew C. Pike
*Attorney, Agent, or Firm*—Daniel M. Stock, Esq.; Roger L. May, Esq.

[57] ABSTRACT

A split joint construction for a space frame on an automotive vehicle includes at least one rocker member extending longitudinally, at least one structural member having extensions extending longitudinally in a first direction and in a second direction opposite to the first direction, each of the extensions having at least one channel to receive the rocker member, and a fastening mechanism for securing the structural member and rocker member together.

6 Claims, 5 Drawing Sheets

SPLIT JOINT CONSTRUCTION FOR A SPACE FRAME

This application is a continuation of U.S. Ser. No. 08/207,983, filed Mar.8, 1994, now abandoned, which is a continuation of U.S. Ser. No. 07/876,156, filed Apr. 30, 1992, now U.S. Pat. No. 5,332,281.

BACKGROUND OF THE INVENTION

1. Field of the Invention

The present invention relates generally to frame structures for automotive vehicles and, more specifically, to the construction of such frames for automotive vehicles.

2. Description of the Related Art

It is known to construct frames defining the general shape of an automotive vehicle and for supporting its various load-bearing functional components from metal components fabricated in a variety of manners. In the interest of enhancing the fuel economy of automotive vehicles, great attention has been given to fabricating vehicular components from lightweight materials. Consistent with this goal, automotive vehicles have been fabricated which use lightweight outer decorative panels fabricated from plastics which are fixedly secured to a structural inner frame or "space frames".

It is known to fabricate such space frames from a number of tubular members that are joined by fixed connectors to define the general shape of the automotive vehicle. While this approach provides a distinct advantage in the tooling cost of manufacturing over the conventional fabrication of unibody construction through massive stampings, it suffers from the disadvantage that the connectors utilized for joining the tubular members together tend to be massive and expensive to fabricate and assemble. This approach also suffers from the disadvantage that it is not flexible to allow frequent component changes. Further, this approach suffers from the disadvantage of not allowing for common and interchangeable components between various automotive model lines. Additionally, this approach suffers from the disadvantage of not allowing assembly using spot welding and mechanical fastening.

SUMMARY OF INVENTION

Accordingly, the present invention is a rocker construction for a space frame on an automotive vehicle. The rocker construction includes at least one elongated rocker member having means forming an open portion and an elongated cover member adapted to close the open portion. The rocker construction includes means for securing the rocker member and cover member together.

Also, the present invention is a space frame for an automotive vehicle. The space frame includes at least one longitudinally extending rocker member having means forming an open portion. The space frame also includes at least one longitudinally extending cover member adapted to close the open portion and means for securing the rocker member and cover member together.

Further, the present invention is a method of constructing a space frame for an automotive vehicle. The method includes the steps of forming at least one longitudinally extending rocker member with at least one open portion and forming at least one longitudinally extending cover member. The method also includes the steps of closing the open portion with the cover member and securing the cover member to the rocker member.

Additionally, the present invention includes various joint constructions for joining structural members and subassemblies of the space frame together. The present invention also includes various methods of constructing the joints and joining subassemblies of the space frame together.

One advantage of the present invention is that a space frame, rocker construction, and various joint constructions are provided for an automotive vehicle. Another advantage of the present invention is that the rocker and joint constructions allow automotive subassemblies of the space frame to be assembled together. Yet another advantage of the present invention is that the space frame provides flexibility by allowing the space frame to be made with a metal material. The space frame minimizes material and investment costs by using preformed metal tubing, rolled sheet metal, and simple stampings joined by welding, mechanical fastening, and/or adhesive. Still another advantage of the present invention is that the space frame provides manufacturing flexibility by allowing inexpensive product changes, high commonality, and interchangeability between automotive model lines. A further advantage of the present invention is that the space frame provides product flexibility by employing scaleable, modular construction. A still further advantage of the present invention is that the space frame reduces facilities and tooling investment to a fraction of traditional levels resulting in lower cost of fabrication and assembly.

Other objects, features, and advantages of the present invention will be readily appreciated as the same becomes better understood after reading the following description taken in conjunction with the accompanying drawings.

DESCRIPTION OF THE PREFERRED EMBODIMENT(S)

Figures 1, 2:
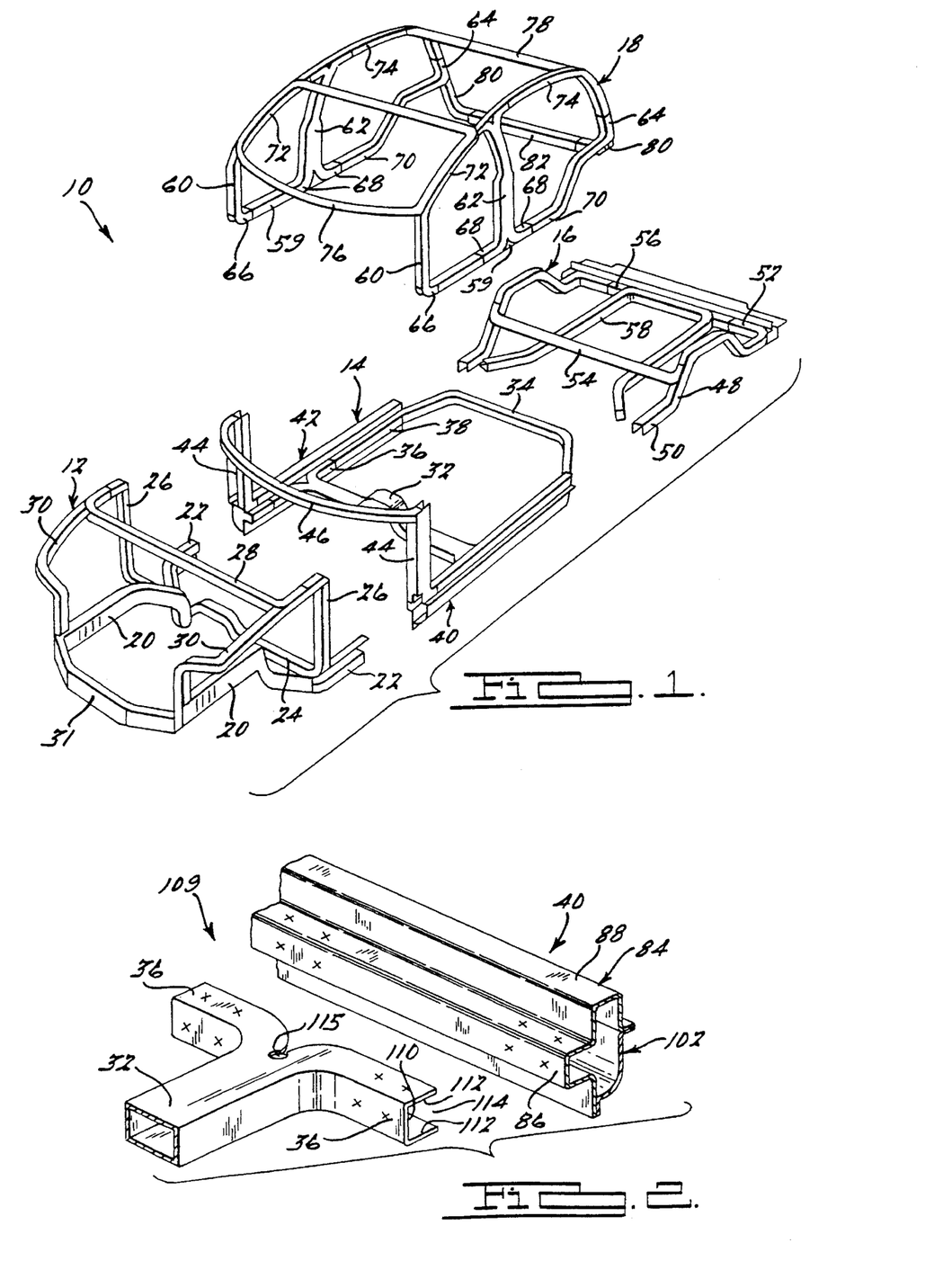
FIG. 1 is an exploded perspective view of a space frame according to the present invention.
FIG. 2 is an exploded perspective view of a split tube joint construction, according to the present invention, of the space frame of FIG. 1.

Turning now to the drawings and in particular to FIG. 1 thereof, a space frame 10 according to the present invention is illustrated for an automotive vehicle. The space frame 10 includes a front structural subassembly, generally indicated at 12, a center structural subassembly, generally indicated at 14, a rear structural subassembly, generally indicated at 16, and a greenhouse structural subassembly, generally indicated at 18.

The front structural subassembly 12 includes longitudinally extending side rails 20. The side rails 20 have longitudinally extending extensions 22 at one end thereof. The front structural subassembly 12 also includes an end cross member 24 connected to one end of the side rails 20 and having vertically extending pillar members 26. The front structural subassembly 12 includes a laterally extending upper cross member 28 connected to the pillar members 26 by inclined members 30. The inclined members 30 interconnect the upper cross member 28 and the pillar members 26 and the other end of the side rails 20. The front structural subassembly 12 also includes a laterally extending bumper cross member 31 interconnecting the other end of the side rails 20. The front structural subassembly 12 may include other members to support an automotive engine and its associated componentry (not shown).

The center structural subassembly 14 includes laterally extending center and rear cross members 32, 34 each having longitudinally extending extensions 36, 38, respectively. The center structural subassembly 14 also includes a pair of rocker constructions or assemblies, generally indicated at 40 and 42, connecting or joining the center and rear cross members 32, 34 together. The rocker constructions 40 and 42 also connect or join the front structural subassembly 12, rear structural subassembly 16, and greenhouse structural subassembly 18 to the center structural subassembly 14 as will be described. The center structural subassembly 14 further includes vertically extending pillar members 44 connected to the rocker constructions 40, 42 and a laterally extending upper cross member 46 interconnecting the pillar members 44.

The rear structural subassembly 16 includes longitudinally and vertically extending side rails 48 having a longitudinally extending extension 50 at one end and a laterally extending extension 52 at the other end. The rear structural subassembly 16 includes laterally extending front and rear cross members 54, 56 interconnecting the side rails 48. The rear structural subassembly 16 also includes a generally U-shaped support member 58 connected to the rear cross member 56 and extending longitudinally toward the extensions 50 of the side rails 48.

The greenhouse structural subassembly 18 includes longitudinally extending side rails 59. The greenhouse structural subassembly 18 also includes vertically extending front, center, and rear pillar members 60, 62, 64 each having longitudinally extending extensions 66, 68, 70, respectively, connected to the side rails 59. The greenhouse structural subassembly 18 includes vertically and longitudinally extending front and rear upper side members 72, 74 interconnecting the pillar members 60, 62, 64. The greenhouse structural subassembly 18 also includes a hoop shaped front member 76 interconnecting the front upper side members 72, and a laterally extending cross member 78 interconnecting the rear upper side members 74. The greenhouse structural subassembly 18 further includes vertically and laterally extending L-shaped members 80 connected to the rear pillar members 64 and interconnected by a laterally extending end cross member 82.

The space frame 10 may include other structural members which are not specifically described to form the space frame 10 illustrated in FIG. 1. The structural members are preassembled into the structural subassemblies 12, 14, 16, 18 using suitable means such as welding, mechanical fastening, and/or an adhesive to be described. The structural members of the space frame 10 are generally tubular members extruded, roll-formed, and/or stamped from a metal material such as an aluminum or steel material. Preferably, the tubular members have a generally rectangular crosssection. It should be appreciated that other suitable materials and crosssectional shapes may be used.

Figure 3:
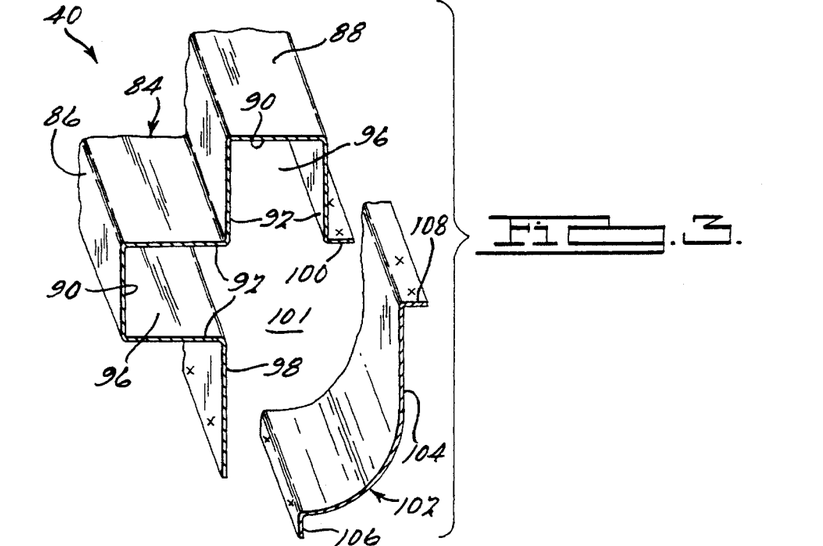
FIG. 3 is an exploded perspective view illustrating a rocker construction, according to the present invention, of the space frame of FIG. 1.

Referring to FIGS. 2 and 3, the rocker constructions 40, 42 include an elongated or longitudinally extending rocker or rocker member, generally indicated at 84. The rocker member 84 is identical for the rocker constructions 40, 42, except one is left-handed and the other is right-handed. As a result, only the rocker construction 40 will be specifically described. The rocker member 84 includes at least one, preferably a plurality of, elongated locating lobes or channel members 86, 88. The channel members 86, 88 are arranged perpendicularly to each other such that one channel member 86 is horizontally orientated and the other channel member 88 is vertically orientated. The channel members 86, 88 are generally U-shaped in crosssection. The channel members 86, 88 serve as the mounting surfaces for cross members and pillar members of the space frame 10.

As illustrated in FIG. 3, the channel members 86, 88 have a base wall 90 and a pair of side walls 92 connected to the base wall 90. The side walls 92 are spaced and substantially parallel to each other. The base wall 90 and side walls 92 cooperate to form generally rectangular shaped channels 96. The channels 96 are orientated at an angle of ninety degrees (90°) relative to each other. The rocker member 84 includes flanges 98 and 100 extending perpendicularly outwardly from a side wall 92 on each of the channel members 86, 88, respectively, to form an open portion 101 therebetween. Preferably, the base walls 90, side walls 92, and flanges 98, 100 are integral and formed as one-piece. Preferably, the rocker member 84 is formed from a metal material such as an aluminum or steel material. It should be appreciated that other suitable cross-sectional shapes and materials may be used.

The rocker construction 40 also includes an elongated or longitudinally extending cover member, generally indicated at 102, to close the open portion 101 of the rocker member 84. The cover member 102 has a base wall 104 which is generally arcuate in shape. The cover member 102 includes flanges 106, 108 extending outwardly at each end of the base wall 104 and orientated at an angle of ninety degrees (90°) relative to each other. Preferably, the base wall 104 and flanges 106, 108 are integral and formed as one piece from a metal material such as an aluminum or steel material. Preferably, the rocker member 84 and cover member 102 are fabricated by roll-forming using conventional equipment. It should be appreciated that other suitable shapes and materials may be used.

Referring to FIG. 2, a split tube joint construction 109, according to the present invention, is shown. The split tube joint construction 109 includes the rocker member 84 and the extensions 36, 38 of the space frame 10. The extensions 36 of the center cross member 32 extend longitudinally and are generally C-shaped in cross-sectional shape. The extensions 36 have a base wall 110 and a pair of side walls 112 connected to the base wall 110. The side walls 112 are spaced and substantially parallel to each other. The base wall 110 and side walls 112 cooperate to form a generally rectangular shaped channel 114. The extensions 36 form a general "L" shape with the center cross member 32 to form a split tube construction. The center cross member 32 may include an aperture 115 between the intersection of the extensions 36 to reduce stress therebetween.

In operation, the split tube joint construction 109 is assembled by disposing the horizontally orientated channel member 86 in the channel 114 of the extensions 36 of the center cross member 32. The extensions 36 are secured to the rocker construction 40 by suitable means such as welding. Preferably, spot-welding is used. Access for the spot-welding guns (not shown) is provided by the open rocker construction 40 to secure the base walls 90, 92 and side walls 110, 112 together at the locations marked with a letter "X". It should be appreciated that the channel member 86 may have a slight taper to assure proper nesting within the channel 114 of the extensions 36.

Once the cross member 32 is secured to the rocker member 84, the cover member 102 is secured to the rocker member 84 by suitable means such as welding. Preferably, spot-welding is used to secure the flanges 98, 100 and 106, 108 together, respectively, at the locations marked with a letter "X".

Figure 4:
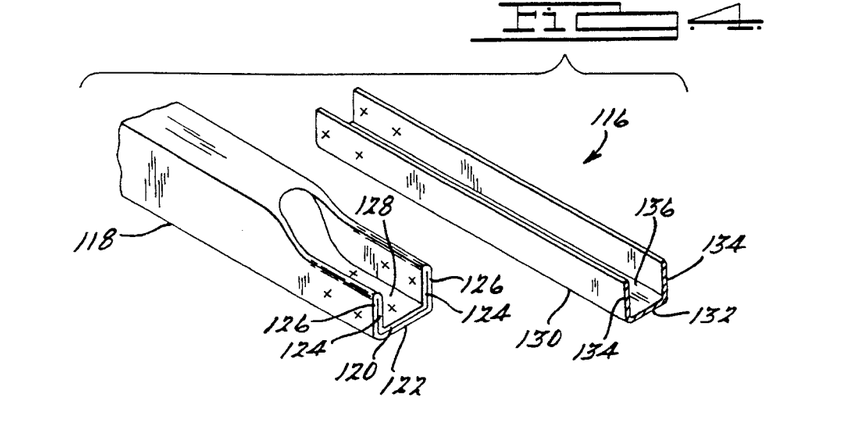
FIG. 4 is an exploded perspective view of a pinched tube joint construction, according to the present invention, of the space frame of FIG. 1.

Referring to FIG. 4, a pinched tube joint construction 116, according to the present invention, is shown. The pinched tube joint construction 116 includes a first structural member 118 of the space frame 10 with a generally tubular and rectangular cross-sectional shape. One end of the first structural member 118 is "pinched" using conventional liquid pressure to form a generally U-shaped configuration. Liquid pressure forming of the pinched end is known in the art and is accomplished using a process under the trade name "Variforming" by TI Vari-Form Inc. of Warren, Mich. or "Hydroforming" by A. O. Smith Co. The pinched end of the first structural member 118 has overlapping inner and outer base walls 120, 122 and side walls 124, 126, respectively. The inner side walls 124 and base walls 120 cooperate to form a generally rectangular shaped channel 128.

The pinched tube joint construction 116 also includes a second structural member 130 having a generally U-shaped cross-sectional shape. The second structural member 130 has a base wall 132 and a pair of side walls 134 connected to the base wall 132. The side walls 134 are spaced and substantially parallel to each other. The base wall 132 and side walls 134 cooperate to form a generally rectangular shaped channel 136.

In operation, the pinched tube joint construction 116 is assembled by disposing the second structural member 130 in the channel 128 of the first structural member 118. The second structural member 130 is secured to the first structural member 118 by suitable means such as welding. Preferably, spot-welding is used to secure the base walls 120, 122, 132 and side walls 124, 126, 134 together at the locations marked with a letter "X". It should be appreciated that the pinched tube joint construction 116 may be used at suitable locations on the space frame 10 for joining structural members previously described.

Figure 5:
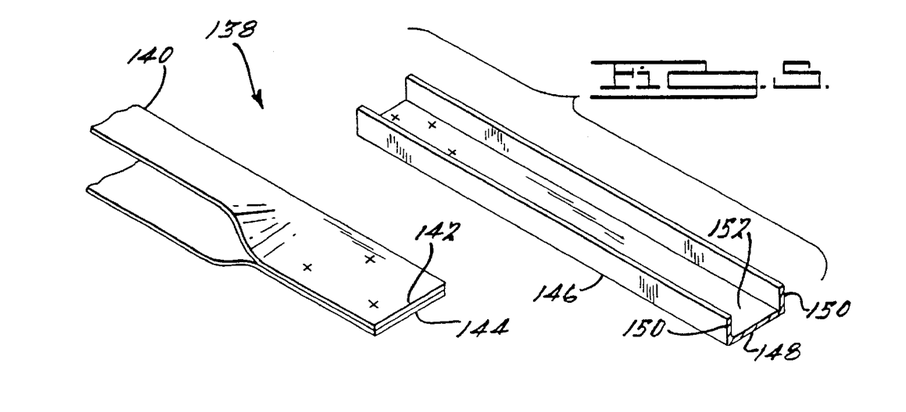
FIG. 5 is an exploded perspective view of a flattened joint construction, according to the present invention, of the space frame of FIG. 1.

Referring to FIG. 5, a flattened ("spade") joint construction 138, according to the present invention, is shown. The flattened joint construction 138 includes a first structural member 140 having a generally C-shaped cross-sectional shape. One end of the first structural member 138 is flattened using conventional methods and equipment such that side walls 142, 144 contact or abut each other. It should be appreciated that the flattened side walls 142 may be trimmed to form linear edges.

The flattened joint construction 138 also includes a second structural member 146 having a generally U-shaped cross-sectional shape. The second structural member 146 has a base wall 148 and a pair of side walls 150 connected to the base wall 148. The side walls 150 are spaced and substantially parallel to each other. The base wall 148 and side walls 150 cooperate to form a generally rectangular shaped channel 152.

In operation, the flattened joint construction 138 is assembled by disposing the second structural member 146 on the flattened end of the first structural member 140. The second structural member 146 is secured to the first structural member 140 by suitable means such as welding. Preferably, spot-welding is used to secure the base wall 148 and side walls 142, 144 together at the locations marked with a letter "X". It should be appreciated that the flattened joint construction 138 may be used at suitable locations on the space frame 10 for joining structural members previously described.

Figure 6:
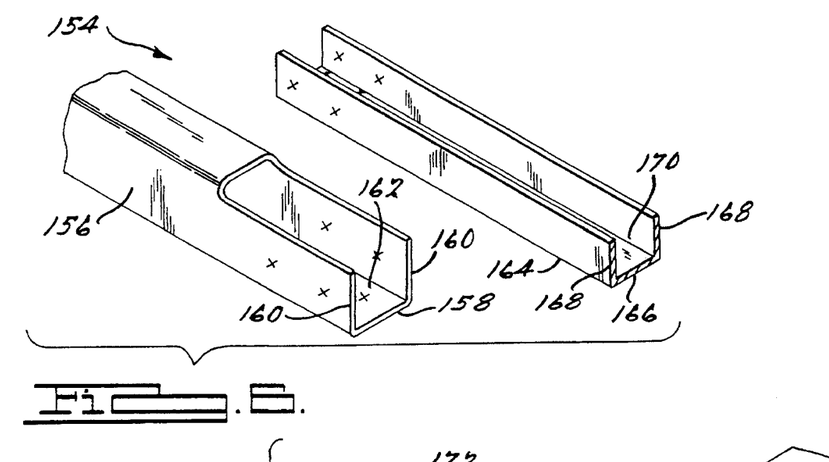
FIG. 6 is an exploded perspective view of a shaved tube joint construction, according to the present invention, of the space frame of FIG. 1.

Referring to FIG. 6, a shaved tube joint construction 154, according to the present invention, is shown. The shaved tube joint construction 154 includes a first structural member 156 with a generally tubular and rectangular cross-sectional shape. One end of the first structural member 156 has a wall removed or shaved off using conventional lasers or plasma cutters to form a generally U-shaped configuration. The shaved end of the first structural member 156 has a base wall 158 and a pair of side walls 160 connected to the base wall 158. The side walls 160 are spaced and substantially parallel to each other. The side walls 160 and base wall 158 cooperate to form a generally rectangular shaped channel 162.

The shaved tube joint construction 154 also includes a second structural member 164 having a generally U-shaped cross-sectional shape. The second structural member 164 has a base wall 166 and a pair of side walls 168 connected to the base wall 166. The side walls 168 are spaced and substantially parallel to each other. The base wall 166 and side walls 168 cooperate to form a generally rectangular shaped channel 170.

In operation, the shaved tube joint construction 154 is assembled by disposing the second structural member 164 in the channel 162 of the first structural member 156. The second structural member 164 is secured to the first structural member 156 by suitable means such as welding. Preferably, spot-welding is used to secure the base walls 158, 166 and side walls 160, 168 together at the locations marked with a letter "X". It should be appreciated that the shaved tube joint construction 154 may be used at-suitable locations on the space frame 10 for joining structural members previously described.

Figures 7, 8:
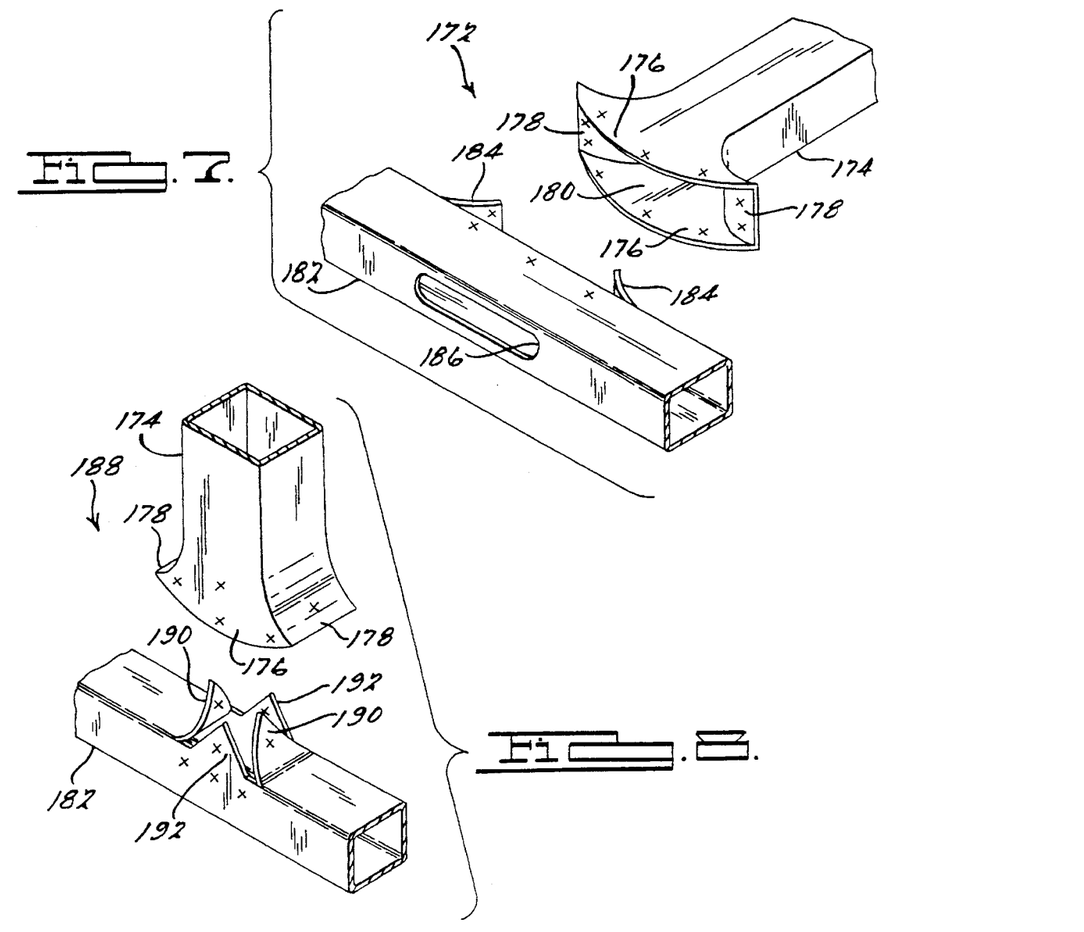
FIG. 7 is an exploded perspective view of a fishmouth joint construction, according to the present invention, of the space frame of FIG. 1.
FIG. 8 is an exploded perspective view of a self-locating fishmouth joint construction, according to the present invention, of the space frame of FIG. 1.

Referring to FIG. 7, a fishmouth joint construction 172, according to the present invention, is shown. The fishmouth joint construction 172 includes a first structural member 174 having a generally rectangular cross-sectional shape. One end of the first structural member 174 is widened laterally to form a "fishmouth" using conventional methods and equipment such as induction preheating. The fishmouth end of the first structural member 174 has elongated base walls 176 and generally arcuate side walls 178. The base and side walls 176, 178 cooperate to form an elongated opening 180.

The fishmouth joint construction 172 also includes a second structural member 182 having a generally rectangular cross-sectional shape. One wall of the second structural member 184 is pierced transversely using conventional methods and equipment to form generally arcuate flaps 184 to conform or mate with interior surfaces of the side walls 178. The second structural member 182 also includes an elongated aperture 186 extending through a wall opposite the flaps 184 to provide access for spot-welding guns.

In operation, the fishmouth joint construction 172 is assembled by disposing the fishmouth end of the first structural member 174 over the flaps 184 of the second structural member 182. The first structural member 174 is secured to the second structural member 182 by suitable means such as welding. Preferably, spot-welding is used to secure the base walls 176 and side walls 178 to the flaps 184 and the walls of the second structural member 182, respectively, at the locations marked with a letter "X". It should be appreciated that the fishmouth joint construction 172 may be used at suitable locations on the space frame 10 for joining structural members previously described.

Referring to FIG. 8, a self-locating fishmouth joint construction 188, according to the present invention, is shown. Like parts of the fishmouth joint construction 172 have like numbers for the self-locating fishmouth joint construction 188. One wall of the second structural member 182 is pierced diagonally to form generally arcuate and linear flaps 190, 192 having a generally triangular shape. Preferably, spot-welding is used to secure the arcuate flaps 190 and side walls 178 together and the linear flaps 192 and base walls 176 together at the locations marked with a letter "X". It should be appreciated that the self-locating fishmouth joint construction 188 may be used at suitable locations on the space frame 10 for joining structural members previously described.

Figure 9:
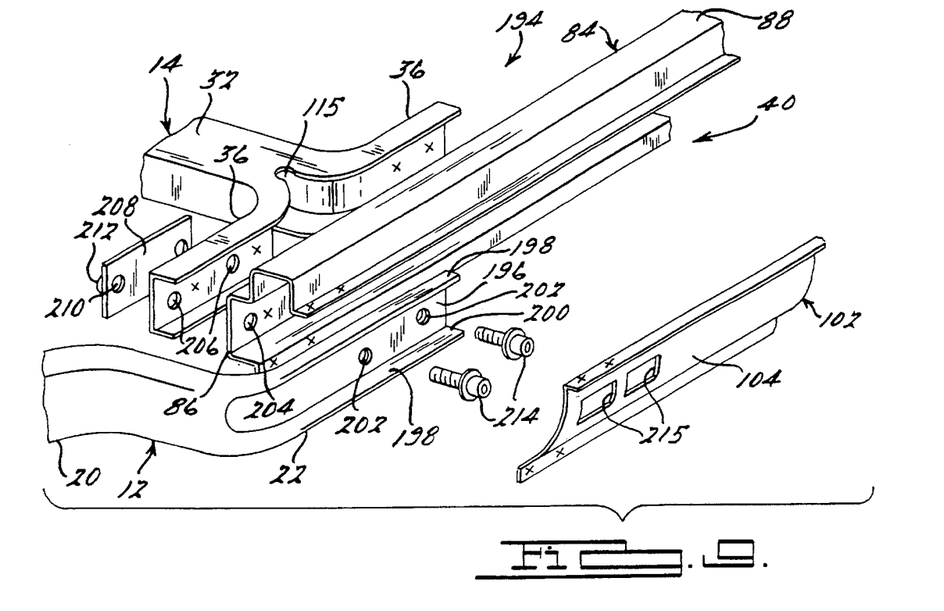
FIG. 9 is an exploded perspective view of a first subassembly joint construction, according to the present invention, of the space frame of FIG. 1.

Referring to FIG. 9, a first subassembly joint construction 194, according to the present invention, is shown. The first subassembly joint construction 194 joins the first structural subassembly 12 and center structural subassembly 14 together. The first subassembly joint construction 194 includes the center cross member 32, rocker constructions 40, 42, and side rails 20. The extension 22 of the side rail 20 is pinched using conventional liquid pressure to form a generally U-shaped cross-sectional shape. The extension 22 has a base wall 196 and a pair of side walls 198 connected to the base wall 196. The side walls 198 are spaced and substantially parallel to each other. The base wall 196 and side walls 198 cooperate to form a generally rectangular shaped channel 200. The first subassembly joint construction 194 includes at least one and preferably a plurality of apertures 202, 204, 206 extending through the base walls 196, 90, 110 of the extension 22, rocker member 84, and extension 36, respectively.

The first subassembly joint construction 194 also includes a plate member 208 having apertures 210 extending therethrough and aligned with the apertures 202, 204, 206. The plate member 208 is generally rectangular in shape and has nuts 212 secured adjacent the apertures 210 by suitable means such as welding. The first subassembly joint construction 194 includes threaded fasteners 214 such as bolts extending through the aperture 202, 204, 206, 210 and threadably engaging the nuts 212. The cover member 102 may include apertures 215 extending through the base wall 104 thereof to allow access to the fasteners 214.

In operation, the first subassembly joint construction 194 is assembled by disposing the channel member 86 of the rocker member 84 in the channels 114 of the extensions 36. The rocker member 84 is then secured to the center cross member 34 by suitable means such as welding as previously described in connection with FIG. 2. Next, the extension 22 is disposed in the channel 96 of the channel member 86. The plate member 208 is disposed against the base wall 110 of the extension 36. The apertures 202, 204, 206, 210 are aligned and the fasteners 214 extended therethrough. The fasteners 214 are rotated and threadably engage the nuts 212 to secure the side rail 20, rocker member 84, and center cross member 34 together. The cover member 102 is then secured to the rocker member 84 as previously described.

Figure 10:
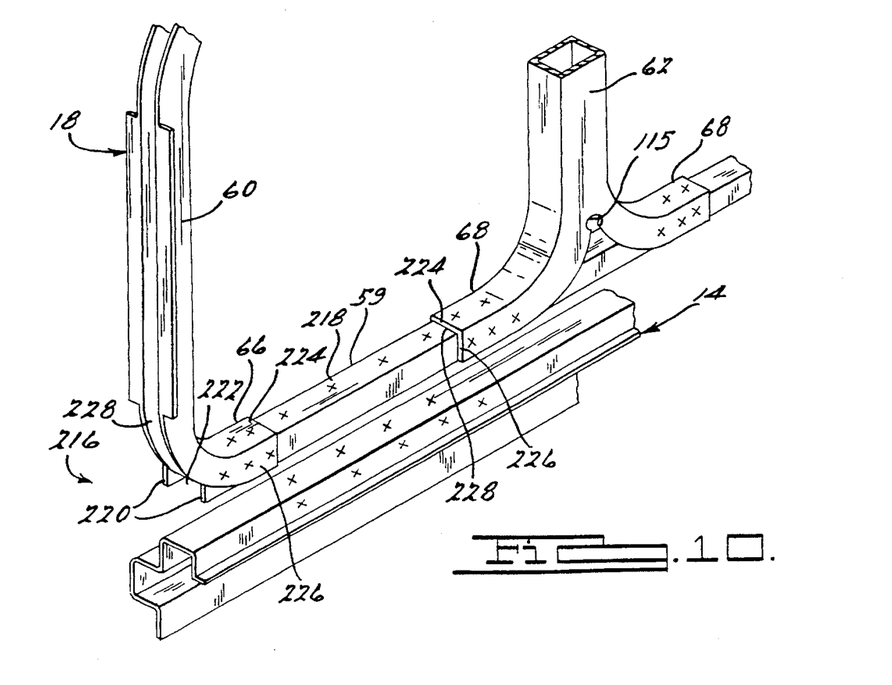
FIG. 10 is an exploded perspective view of a second subassembly joint construction, according to the present invention, of the space frame of FIG. 1.

Referring to FIG. 10, a second subassembly joint construction 216, according to the present invention, is shown. The second subassembly joint construction 216 joins the greenhouse structural subassembly 18 to the center structural subassembly. 14. The second subassembly joint construction 216 includes the side rails 59 and rocker construction 40, 42. The side rail 59 of the greenhouse structural subassembly 18 has a generally inverted "U" cross-sectional shape. The side rail 59 has a base wall 218 and a pair of side walls 220 connected to the base wall 218 and cooperate to form a generally rectangular-shaped channel 222.

The extensions 66 and 68 of the pillar members 60, 62 are generally U-shaped in cross-sectional shape. The extensions 66, 68 have a base wall 224 and a pair of side walls 226 connected to the base wall 224. The side walls 226 are spaced and substantially parallel to each other. The base wall 224 and side walls 226 cooperate to form a generally rectangular shaped channel 228.

In operation, the side rail 59 is disposed in the channels 228 of the extensions 66 and 68. The extensions 66 and 68 are secured to the side rail 59 by suitable means such as welding. Preferably, spot-welding is used to secure the base walls 218, 224 and side walls 220, 226 together at the locations marked with a letter "X".

To assemble the second subassembly joint construction 216, the greenhouse structural subassembly 18 is lowered onto the center structural subassembly 14 such that the channel member 88 is disposed in the channel 222 of the side rail 59. The side rail 59 is secured to the rocker member 84 by suitable means such as welding. Preferably, spot-welding is used to secure the base walls 90, 224 together at the locations marked with a letter "X". The cover member 102 is then secured to the rocker member 84 as previously described.

Figure 11:
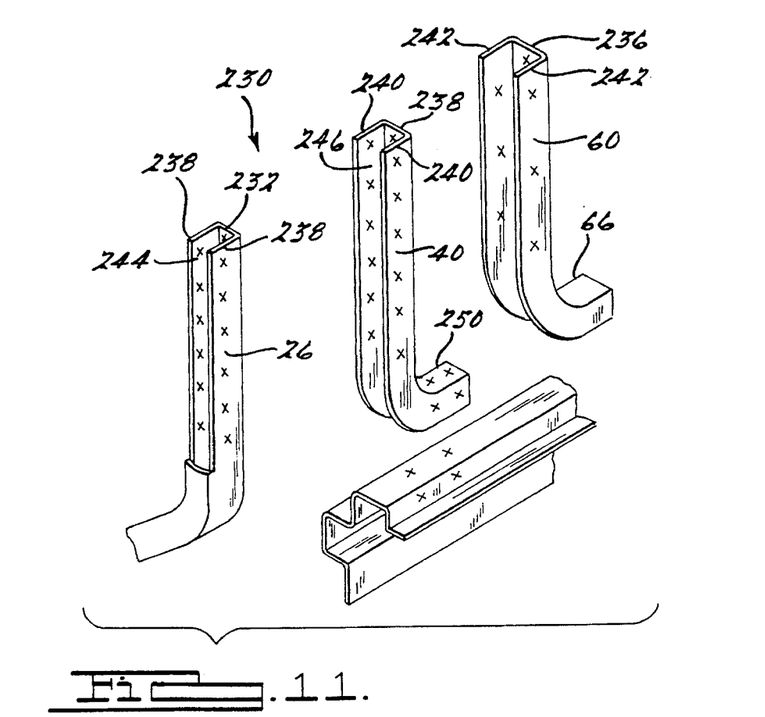
FIG. 11 is an exploded perspective view of a third subassembly joint construction, according to the present invention, of the space frame of FIG. 1.

Referring to FIG. 11, a third subassembly joint construction 230, according to the present invention, is shown. The third subassembly joint construction 230 joins front and greenhouse structural subassemblies 12 and 18 to the center structural subassembly 14. The third subassembly joint construction 230 includes the rocker constructions 40, 42 and pillar members 26, 44, 60. The pillar member 26 has a shaved end form a generally U-shaped cross-sectional shape. The pillar members 44, 60 are formed generally U-shaped in cross-sectional shape. The pillar members 26, 44, 60 have base walls 232, 234, 236, respectively, and a pair of side walls 238, 240, 242 connected to the base walls 232, 234, 236. The side walls 238, 240, 242 are spaced and substantially parallel to each other. The base walls 232, 234, 236 and side walls 238, 240, 244 cooperate to form generally rectangular shaped channels 244, 246, 248. The pillar member 44 also has a longitudinally extending extension 250 similar to extension 66 of the pillar member 60.

In operation, the third subassembly joint construction 230 is assembled by disposing the channel member 88 in the channel 246 of the extension 250. The extension 250 is secured to the rocker member 84 by suitable means such as welding. Preferably, spot-welding is used to secure the base walls 234, 90 and side walls 240, 92 together at the locations marked with a letter "X".

To join the front structural subassembly 12 to the center structural subassembly 14, the pillar member 26 is disposed in the channel 246 of the pillar member 44. The pillar member 26 is secured to the pillar member 44 by suitable means such as welding. Preferably, spot-welding is used to secure the base walls 232, 234 and side walls 238, 240 together at the locations marked with a letter "X".

To join the greenhouse structural subassembly 18 to the center structural subassembly 14, the pillar member 44 is disposed in the channel 248 of the pillar member 60. The pillar member 60 is secured to the pillar member 44 by suitable means such as welding. Preferably, spot-welding is used to secure the base walls 234, 236 and side walls 240, 242 together at the locations marked with a letter "X".

Figure 12:
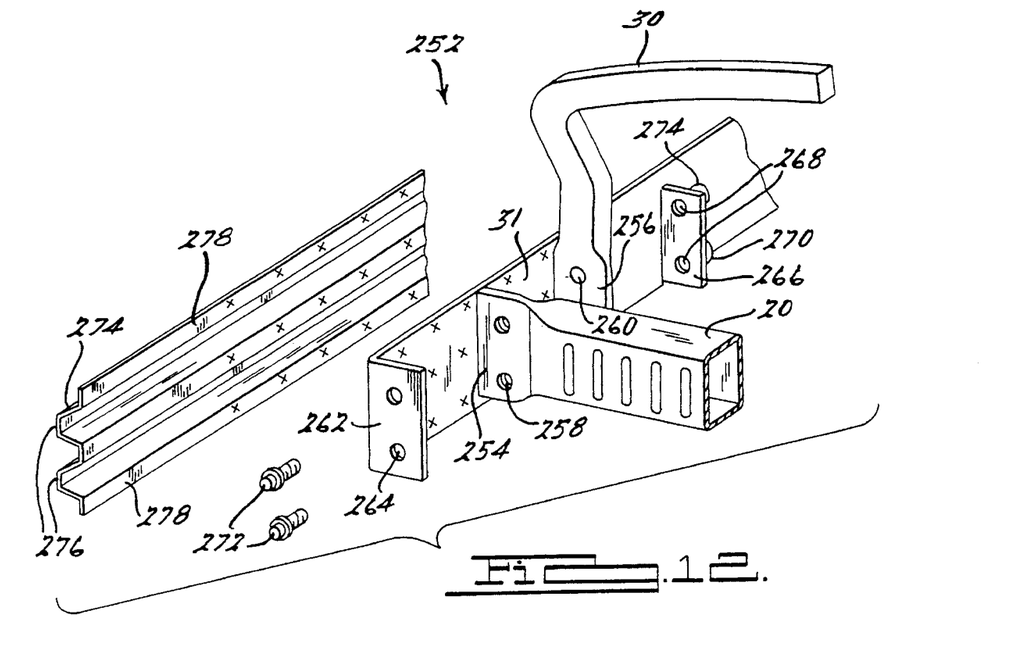
FIG. 12 is an exploded perspective view of a bumper joint construction, according to the present invention, of the space frame of FIG. 1.

Referring to FIG. 12, a bumper joint construction 252, according to the present invention, is shown. The bumper joint construction 252 includes pinched ends 254,256 on the side rails 20 and inclined members 30, respectively. The pinched ends 254, 256 have apertures 258, 260 extending therethrough. The bumper cross member 31 includes a longitudinally extending extension 262 having apertures 264 extending therethrough and aligned with apertures 258, 260. The bumper joint construction 252 also includes a plate member 266 having apertures 268 extending therethrough and aligned with apertures 258, 260, 264. The plate member 266 is generally rectangular in shape and has nuts 270 secured adjacent the apertures 268 by suitable means such as welding. The bumper joint construction 252 includes threaded fasteners 272 such as bolts extending through the apertures 264, 258, 260, 268 and threadably engaging the nuts 270. The bumper joint construction 252 may include a bumper member 274 having corrugations 276 and a plurality of planar portions 278. The bumper member 274 is secured to the bumper cross member 31 by suitable means such as welding. Preferably, spot-welding is used to secure the planar portions 278 and the bumper cross member 31 together at the locations marked with a letter "X".

In operation, the bumper Joint construction 252 is assembled by disposing the extension 262, pinched ends 254, 256, and plate member 266 together such that the apertures 264, 258, 260, 268 are aligned. The fasteners 272 are extended through the apertures 264, 258, 260, 268 and rotated to engage the nuts 270, thereby securing the end cross member 31, side rail 20, and inclined member 30 together.

Accordingly, the rocker constructions can be any desired length without changing the basic fabrication/assembly methods. Cross members, pillar members and attachment points for subassemblies can be lengthened, shortened, and/or modified with minimal investment, enabling construction of any size (length, width, height) space frame.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A split joint construction for a space frame on an automotive vehicle comprising:

at least one rocker member extending longitudinally and including means forming an open portion comprising first flanges each extending outwardly on at least two side edges of said at least one rocker member;

at least one structural member having extensions extending longitudinally in a first direction and in a second direction opposite to said first direction, each of said extensions having a base wall and a pair of side walls spaced and parallel to each other and extending perpendicularly from said base wall to form a C-shaped cross section and at least one channel to receive said at least one rocker member;

said at least one rocker member having at least a pair of projections each having a channel located on adjacent sides of said rocker member, said at least a pair of projections each having a base wall and a pair of side walls spaced and parallel to each other and extending perpendicularly from said base wall to form a C-shaped cross section, one of said at least a pair of projections being disposed within said at least one channel such that said base wall of the one of said at least a pair of projections abuts said base wall of each of said extensions;

a cover member extending longitudinally and having an arcuate base wall with second flanges extending outwardly on at least two edges of said cover member to close said open portion of said at least one rocker member; and means for securing said at least one structural member and rocker member together and said cover member and said at least one rocker member together.

2. A split joint construction as set forth in claim 1 wherein said securing means comprises welds.

3. A space frame for an automotive vehicle comprising:

at least one rocker member extending longitudinally and having first flanges each extending outwardly on at least two side edges of said at least one rocker member;

at least one structural member having extensions extending longitudinally in a first direction and in a second direction opposite to said first direction, each of the extensions having a base wall and a pair of side walls spaced and parallel to each other and extending perpendicularly from said base wall to form a C-shaped cross section and at least one channel to receive said at least one rocker member;

said at least one rocker member having at least a pair of projections each having a channel located on adjacent sides of said rocker member, said at least a pair of projections each having a base wall and a pair of side walls spaced and parallel to each other and extending perpendicularly from said base wall to form a C-shaped cross section, one of said at least a pair of projections being disposed within said at least one channel such that said base wall of the one of said at least a pair of projections abuts said base wall of each of said extensions;

welds for securing said at least one structural member and rocker member together; and a cover member extending longitudinally and having an arcuate base wall with second flanges extending outwardly on at least two edges of said cover member to close said rocker member.

4. A method of constructing a space frame for an automotive vehicle, said method comprising the steps of:

forming at least one longitudinally extending rocker member having at least a pair of channels located on adjacent sides of the rocker member each with a base wall and side walls spaced and parallel to each other and extending perpendicularly from the base wall to form a C-shaped cross section and first flanges extending outwardly from at least two of said side walls of said rocker member;

forming at least one structural member having extensions with a base wall and side walls spaced and parallel to each other and extending perpendicularly from the base wall to form a C-shaped cross section, the extensions extending longitudinally in a first direction and in a second direction opposite to the first direction and each of the extensions having a channel;

forming at least one longitudinally extending cover member with an arcuate base wall having second flanges extending outwardly on at least two edges of said cover member to close an open portion of the rocker member;

disposing the C-shaped cross section of the rocker member within each of the channels such that the base wall of the rocker member abuts the base wall of the extensions;

securing the rocker member and extensions together;

closing the open portion of the rocker member with the cover member; and securing the cover member to the rocker member.

5. A method as set forth in claim 4 wherein said step of securing the rocker member and extensions together comprises welding the side walls and the base wall of the extensions and one of at least a pair of channels of the rocker member together.

6. A method as set forth in claim 4 wherein said step of securing the cover member to the rocker member comprises welding the second flanges of the cover member and the first flanges of the rocker member together to secure the cover member to the rocker member.

* * * * *